United States Patent Office 2,917,668
Patented Dec. 15, 1959

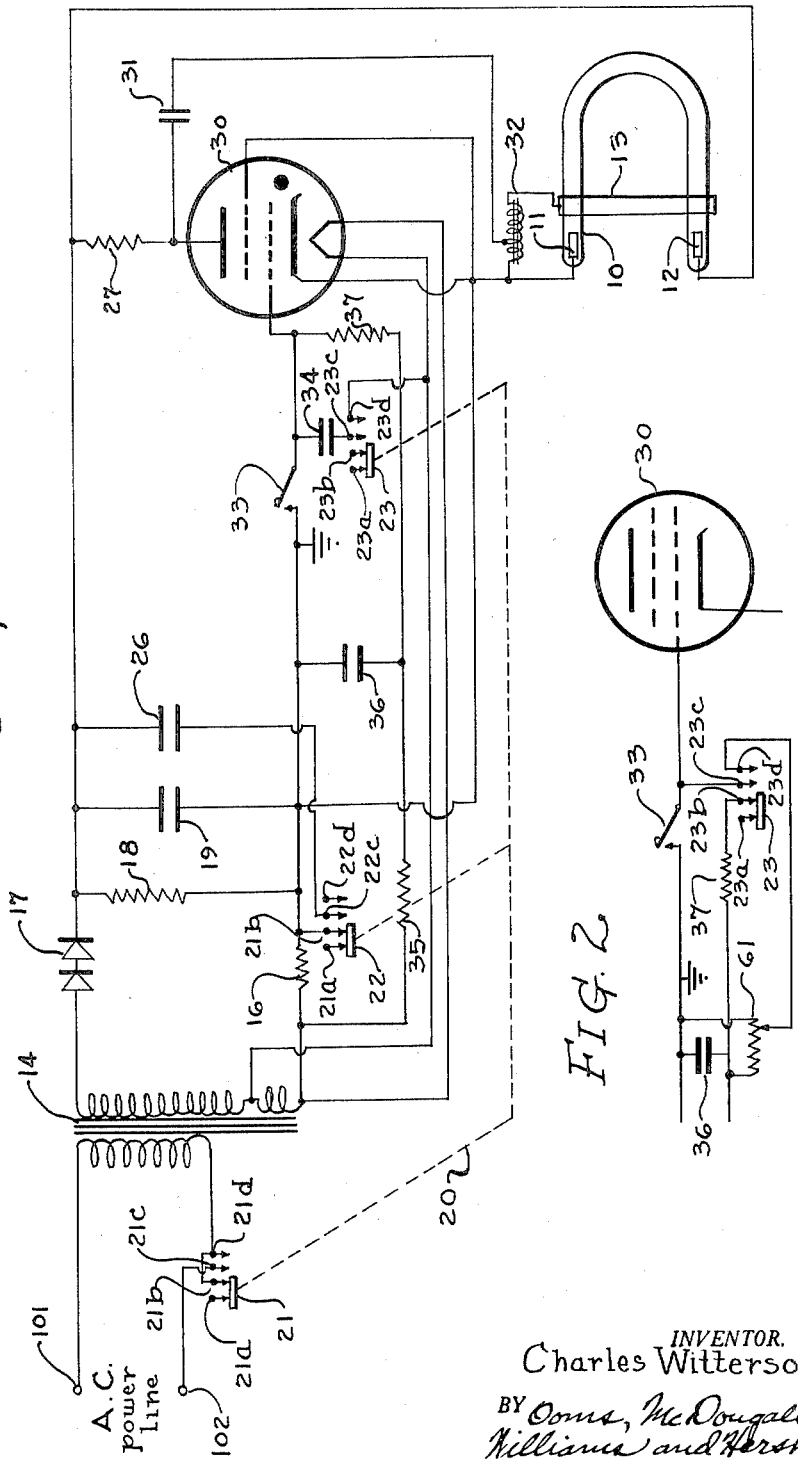

2,917,668

PHOTOGRAPHIC FLASH APPARATUS

Charles Witterson, Round Lake, Ill., assignor, by mesne assignments, to Kemlite Laboratories, Inc., Chicago, Ill., a corporation of Illinois Application September 7, 1956, Serial No. 608,629

4 Claims. (Cl. 315—171)

This invention relates to the field of photographic flash equipment; in particular, it is addressed to a novel electronic flash unit which will, at the option of the operator, provide either a low-intensity, substantially continuous light for modeling purposes or a high-intensity, short-duration flash for actual photography.

Flash photography is popular at present for a number of reasons. It permits the taking of pictures with short exposure times—so-called snap shots—under conditions of ambient light in which such photography would otherwise be impossible. Moreover, the use of a flash source makes possible color photography under conditions in which it would not otherwise be practicable, due to the relatively low photosensitivity of color films.

With its many advantages, flash photography has in the past possessed an important disadvantage—the fact that the conditions of illumination during the brief flash often differed radically from the illumination of the subject at the time the photographer planned his composition. This state of affairs has in the past made "modeling" of a subject for photography very difficult.

Attempts have been made to solve this problem, but none of them has been very satisfactory. "Modeling lights," consisting of incandescent bulbs or other continuous light sources, have been used. Sometimes, indeed, the "modeling lights" have even been mounted within the same reflectors as the gaseous-discharge tubes used to produce flashes. In all such cases, however, the unavoidable difference in position between the modeling light and the flash tube has forced the photographer to plan his composition under a different set of lighting conditions than those existing during the actual exposure of his film.

The object of the present invention is to provide a photographic flash unit which provides means by which the photographer can duplicate, on a continuous basis and with lower intensity, the identical lighting conditions existing during the exposure of his film. By achieving this highly desirable object, I have provided a flash unit with which a photographer can plan his composition, appraise the illumination of the subject under steady-state conditions, achieve the precise distribution of light and shadow that he desires, and then take the picture with the assurance that the illumination of his subject by the brilliant flash will be proportionately identical to the illumination that existed during the "modeling" period.

My invention embodies a photographic flash unit using a conventional gaseous-discharge flash tube in a novel circuit arrangement by means of which the photographer may, at will, either operate the tube in the conventional manner to produce a brilliant flash synchronized with the opening of his camera shutter or can make the tube deliver what to the eye appears to be a steady light of much lower intensity but having precisely the same spatial distribution.

In the accompanying drawing, I have shown in Figure 1 a schematic diagram of a typical flash unit embodying my invention. Fig. 2 is a fragmentary schematic diagram showing an optional modification of the Fig. 1 circuit.

Referring now to Fig. 1, I show therein a flash unit embodying a typical grid-controlled flash tube 10, filled with xenon or other suitable gas and having a pair of terminal electrodes 11 and 12. The control grid of the flash tube 10 is marked 13.

The illustrated embodiment of my invention is designed for operation from a conventional A.-C. power line, the terminals of which are indicated on the drawing by the numbers 101 and 102. A transformer 14 is provided with a primary winding adapted for connection to the A.-C. power line and a secondary winding having a tap near one end to provide a low output voltage for filament-heating purposes. The total developed voltage across the secondary winding will normally be several hundred volts, the exact value depending on the particular type of flash tube 10 selected.

As an important component of the illustrated embodiment I provide a three-position, three-pole switch 20, of the type wherein each movable member bridges an adjacent pair of fixed contacts, there being four contacts associated with each pole. The various contacts associated with the first pole 21 are designated 21a, 21b, 21c, and 21d. The corresponding contacts associated with the second pole 22 are marked 22a, etc., and the contacts cooperating with the third pole 23 are marked 23a, etc.

Switch contacts 21b and 21d are connected together and are joined to one terminal of the primary winding of transformer 14. The other terminal of primary winding 14 is connected to power-line terminal 101. The other power-line terminal is connected to switch contact 21c.

The low-potential terminal of the secondary winding of transformer 14 and the low-voltage tap on that winding are respectively connected to the heater terminals of a thyratron tube 30. The low-potential terminal of the secondary winding is also connected to ground through resistor 16.

A rectifier element 17 is connected to the high-potential terminal of the secondary winding of transformer 14, the polarity of rectifier 17 being selected to provide a positive potential at its output, relative to ground. A bleeder resistor 18 is connected between the output terminal of rectifier 17 and ground.

A relatively small storage capacitor 19 is bridged across resistor 18, while a much larger storage capacitor 26 is connected between the output terminal of rectifier 17 and switch contact 22c. Switch contact 22b is grounded.

The positive terminal of rectifier 17 is connected to terminal electrode 12 of flash tube 10, while the other terminal electrode 11 of flash tube 10 is grounded.

The anode of thyratron tube 30 is connected to the output terminal of rectifier 17 through resistor 27, and the cathode of tube 30 is grounded. If the thyratron 30 be of the tetrode type, the shield grid may also be grounded.

The anode of thyratron 30 is connected through coupling capacitor 31 to the input tap of pulse transformer 32, the low-potential terminal of which is grounded and the high-potential terminal of which is connected to grid 13 of flash tube 10.

Pulse transformer 32 is a conventional element which, in modern flash tubes, is often physically built into the base of the tube itself.

Connected between the grid of thyratron 30 and ground is a single-pole, single-throw switch 33 which, as will be explained later, is closed to produce the brilliant flash used for photography. Often switch 33 will be synchronized with the camera shutter.

A capacitor 34 is connected between the grid of thyratron 30 and switch contact 23c, switch contact 23d being connected to the low-voltage tap on the secondary winding of transformer 14.

A resistance-capacitor filter consisting of resistor 35 and capacitor 36 is bridged across resistor 16, and the junction between elements 35 and 36 is connected to the grid of thyratron 30 through resistor 37.

Operation

In the drawing the three-position switch 20 is shown in the "off" position, at which the power line is connected from the transformer 14.

When the switch 20 is shifted to its second or intermediate position the circuitry is thereby arranged so as to cause the flash tube 10 to function in the conventional manner of photographic flash units. When the switch 20 is thrown to its third position, wherein the c and d contacts of each switch bank are bridged, the unit functions as a low-intensity source of light which, to the eye, appears continuous.

In both the second and third positions of switch 20, the power-line voltage is applied to the transformer 14. Because the ground or reference voltage for the system is at the junction of resistors 16 and 18, rather than at the low-potential terminal of the secondary winding of transformer 14, there are two D.-C. potentials developed by rectifier 17. On the output terminal of rectifier 17 there appears a positive voltage of several hundred volts relative to ground, while at the ungrounded terminal of resistor 16 there appears a much smaller negative voltage. If the resistors 16 and 18 have the same relative magnitude as those indicated on the drawing, the negative potential developed across resistor 16 will be 1/100 as great as the positive voltage across resistor 18.

When the switch 20 is in its third or right-hand position, the large storage capacitor 26 is out of the circuit entirely. When the switch 20 is in its intermediate position, however, capacitor 26 is connected in shunt with the smaller storage capacitor 19, across resistor 18.

In the intermediate position of switch 20, the grid of thyratron 30 is biased negatively by a few volts so long as switch 33 remains open, and when so biased tube 30 is non-conducting. Under those circumstances, the capacitors 19 and 26 become fully charged to the positive potential at the output of rectifier 17.

Upon momentary closure of switch 33, the grid of thyratron 30 is suddenly placed at ground potential, and the thyratron conducts, producing a sudden voltage pulse at its anode. This pulse is transmitted through capacitor 31 to the pulse transformer 32, and a resulting pulse of several thousand volts is applied to the grid 13 of flash tube 10. The electric field resulting from this pulse initiates ionization in flash tube 10, and storage capacitors 19 and 26 are thereupon very rapidly discharged through the flash tube 10, producing a short-duration flash of intensely bright light.

When the capacitors 19 and 26 have been discharged to a voltage below that necessary to sustain ionization in flash tube 10, it will cease to conduct, and re-charging of the capacitors 19 and 26 will then commence.

The operation of my invention with switch 20 in its intermediate position, as just described, is essentially the conventional operation of photographic flash units. I shall now describe the operation of my invention when switch 20 is moved to its third position, whereat the c and d contacts of the respective switch sections are bridged.

Under these conditions, the power supply functions as before, and storage capacitor 19 charges to the positive supply voltage as before. Capacitor 26, however, is out of the circuit. Since capacitor 26 is much larger than capacitor 19—typically more than one hundred times as large—the stored energy in capacitor 19 when fully charged is vastly less than the stored energy under similar conditions in the parallel combination of capacitors 19 and 26 obtained when switch 20 is in its intermediate position.

In the third position of switch 20, the grid of thyratron 30 is, as before, biased a few volts negative, but the A.-C. voltage across the filament-heating portion of the secondary winding of transformer 14 is applied to the grid of tube 30 in shunt with the D.-C. bias. The relative magnitudes of the negative D.-C. bias voltage and the A.-C. voltage impressed on it are so chosen that during the positive portion of the A.-C. cycle the net grid voltage of tube 30 is raised sufficiently to make the tube conduct. When tube 30 conducts, the pulse on its anode is as before transmitted to pulse transformer 32, and flash tube 10 is accordingly made conducting. This produces extremely rapid discharge of capacitor 19 through the flash tube 10, resulting in the production of a flash of light. Because the stored energy in capacitor 19 is only a small fraction of that available when capacitor 26 is in the circuit, the flash thus produced is much less intense. Such flashes, on the other hand, occur once for each cycle of power-line voltage. (Because of the relatively small size of capacitor 19, it has ample time to re-charge between successive cycles of power-line voltage.)

Hence, when the switch 20 is in the third position, flash tube 10 is caused to produce a series of moderate flashes, at the rate of one for each cycle of power-line voltage—commonly sixty cycles per second. Due to the persistence of vision, the effect created is that of apparently continuous illumination of flash tube 10, at a relatively low intensity. Because the light source is the same one which, in the intermediate switch position, produces the intensely brilliant flash used for photography, this moderate, apparently continuous illumination has identically the same spatial distribution as the intense flash.

It will of course be understood that in my invention, as in all electronic flash units, the internal impedance of the D.-C. voltage supply must be sufficiently great that the supply source cannot provide enough current to maintain the flash tube (or the thyratron) continuously ionized. This condition can be met in any desired way. In the illustrated embodiment the secondary winding of transformer 14 has sufficient resistance, together with the D.-C. resistance of rectifier 17 and the resistance of resistor 16, to satisfy this requirement.

From the foregoing description of the operation of my invention, the manner of its use by a photographer will be clear. The photographer will set up his object and the flash unit in the approximate positions desired by him, will throw the switch 20 into the third position, and can then effect final positional adjustment of both his subject and the flash unit in order to achieve precisely the distribution of light and shadow which he desires. When he has thus completed his "modeling," the photographer will shift switch 20 to its intermediate position and can then produce at will the brilliant flash with which the actual photography is achieved.

In some cases, it may be desirable to use a different flashing rate for modeling illumination than one flash per cycle of power-line voltage. This will be particularly true when the power-line frequency is low, such as twenty-five cycles per second. Moreover, photographic flash units are often operated from battery power, in which event no power-line voltage is available. In such situations, the circuit may be so modified that the thyratron operates as a relaxation oscillator and hence spontaneously produces operation of flash tube 10 at a periodic rate determined by the circuit constants. Such a circuit modification is shown in Fig. 2.

In the circuit modification shown in Fig. 2, the grid resistor 37 is connected to terminal 23b rather than being connected directly to the grid of tube 30. Capacitor 34 is eliminated, contact 23c being connected directly to the grid of tube 30. A potentiometer 61, preferably of high resistance such as two megohms, is bridged across capacitor 36, and the adjustable arm of potentiometer 61 is connected to switch contact 23d.

With the Fig. 2 arrangement, the effective wiring of the flash unit with switch 20 in its intermediate position is the same as in the Fig. 1 arrangement. When the switch 20 is in its right-hand or third position, however, the Fig. 2 arrangement places the grid of thyratron 30 at a negative bias which may be controlled by potentiometer 61, without impressing any A.-C. voltage on the grid.

In operation of the Fig. 2 form of my invention, the negative bias on thyratron 30 is adjusted by means of potentiometer 61 to a value at which the thyratron will fire when capacitor 19 is almost fully charged. With its bias thus adjusted, thyratron 30 will function as a self-excited relaxation oscillator, firing when the capacitor 19 is almost fully charged, causing flash tube 10 to conduct under those conditions and rapidly discharge capacitor 19. Capacitor 19 will then be re-charged from the power supply, and the thyratron and flash tube will again fire when recharging is almost completed. The frequency with which this self-pulsing will occur will depend upon the circuit constants, including the size of capacitor 19, the effective internal resistance of the power supply, and the grid bias on thyratron 30, as fixed by the adjustment of potentiometer 61.

The Fig. 2 circuit is merely illustrative of the self-pulsing arrangements that can be provided. Persons skilled in the art will have no difficulty in suggesting other circuit arrangements to provide the same type of operation.

In the drawing, I have indicated typical values for the various circuit elements used in the illustrated embodiment of my invention. These values, it should be understood, are only illustrative, the optimum for any given unit being a matter of design, depending upon the particular type of flash tube 10 being employed and depending also on the light output desired, flashing rate desired, and other factors well known to persons skilled in the art.

Since the illustrated embodiments of my invention are intended to be illustrative only, and since persons skilled in the art will be readily able to make numerous changes in and departures from the illustrated structures without departing from the spirit of my invention, it is my desire that the scope of my invention be determined primarily by reference to the appended claims.

I claim:

1. A photographic flash unit capable at the operator's option of providing modeling light, comprising in combination a gas-filled grid-controlled flash tube having a pair of terminal electrodes, a first storage capacitor, a second storage capacitor having much greater capacitance than said first capacitor, a D.-C. voltage source, circuit means connecting said first capacitor to said voltage source, automatic triggering means operative when activated to ionize periodically the gas in said flash tube, manually operable triggering means for ionizing the gas in said flash tube, switch means having at least two manually selectable positions, and other circuit means associated with said switch means operative in one position of said switch means to connect said second storage capacitor across said voltage source and said terminal electrodes and to disable said automatic triggering means, whereby operation of said manual triggering means will discharge said second capacitor through said flash tube, and operative in the other of said switch positions to disconnect said second capacitor and to activate said automatic triggering means to produce periodic discharges of said first capacitor through said flash tube.

2. A photographic flash unit capable at the operator's option of providing modeling light, comprising in combination a gas-filled grid-controlled flash tube having a pair of terminal electrodes, a first storage capacitor, a second storage capacitor having much greater capacitance than said first capacitor, a D.-C. voltage source, circuit means connecting said first capacitor to said voltage source, a triggering circuit for the grid of said flash tube comprising a thyratron and operative when said thyratron is fired to ionize the gas in said flash tube, manually operable means for firing said thyratron, switch means having at least two manually selectable positions, and other circuit means associated with said switch means operative in one position of said switch means to shunt said second storage capacitor across said voltage source and said terminal electrodes whereby operation of said manual firing means will discharge said second capacitor through said flash tube, and operative in the other of said positions to disconnect said second capacitor and to cause said thyratron to fire periodically, producing periodic discharges of said first capacitor through said flash tube.

3. A photographic flash unit capable at the operator's option of providing modeling light, comprising in combination a gas-filled grid-controlled flash tube having a pair of terminal electrodes, a first storage capacitor, a second storage capacitor having much greater capacitance than said first capacitor, a D.-C. voltage source, circuit means connecting said first capacitor to said voltage source, a triggering circuit for the grid of said flash tube comprising a thyratron and operative when said thyratron is fired to ionize the gas in said flash tube, manually operable means for firing said thyratron, switch means having at least two manually selectable positions, and other circuit means associated with said switch means operative in one position of said switch means to shunt said second storage capacitor across said voltage source and said terminal electrodes whereby operation of said manual firing means will discharge both of said capacitors simultaneously through said flash tube, and operative in the other of said positions to disconnect said second capacitor and to cause said thyratron to fire periodically, producing periodic discharges of said first capacitor through said flash tube.

4. A photographic flash unit according to claim 2 wherein said voltages source comprises a transformer adapted for connection to an A.-C. power line and wherein said other circuit means comprises means for applying an A.-C. voltage derived from said transformer to an electrode of said thyratron for firing said thyratron at the rate of once for each cycle of powerline voltage when said switch means is in said other position.

References Cited in the file of this patent

UNITED STATES PATENTS

| | | |
|---|---|---|
| 2,043,484 | Miller | June 9, 1936 |
| 2,478,901 | Edgerton | Aug. 16, 1949 |
| 2,492,142 | Germeshausen | Dec. 27, 1949 |